(12) United States Patent
Budd et al.

(10) Patent No.: US 8,591,044 B2
(45) Date of Patent: Nov. 26, 2013

(54) PAVEMENT MARKINGS, REFLECTIVE ELEMENTS, AND METHODS OF MAKING MICROSPHERES

(75) Inventors: Kenton D. Budd, Woodbury, MN (US); Matthew H. Frey, Cottage Grove, MN (US); Craig W. Lindsay, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 69 days.

(21) Appl. No.: 13/391,379

(22) PCT Filed: Aug. 21, 2009

(86) PCT No.: PCT/US2009/054629
§ 371 (c)(1),
(2), (4) Date: Jun. 1, 2012

(87) PCT Pub. No.: WO2011/022021
PCT Pub. Date: Feb. 24, 2011

(65) Prior Publication Data
US 2012/0229899 A1    Sep. 13, 2012

(51) Int. Cl.
*G02B 5/128*    (2006.01)

(52) U.S. Cl.
USPC .................................................. 359/536

(58) Field of Classification Search
USPC .............. 359/529–540; 501/34, 10, 2, 33, 41
See application file for complete search history.

(56) References Cited

U.S. PATENT DOCUMENTS

| | | | |
|---|---|---|---|
| 2,924,533 A | 2/1960 | McMullen | |
| 3,149,016 A | 9/1964 | Tung | |
| 3,254,563 A | 6/1966 | deVries | |
| 3,418,896 A | 12/1968 | Rideout | |
| 3,493,403 A | 2/1970 | Tung | |
| 3,499,745 A | 3/1970 | Plumat | |
| 3,946,130 A | 3/1976 | Tung | |
| 4,248,932 A | 2/1981 | Tung et al. | |
| 4,367,919 A | 1/1983 | Tung | |
| 4,758,469 A | 7/1988 | Lange | |
| 4,772,511 A | 9/1988 | Wood | |
| 4,988,541 A | 1/1991 | Hedblom | |
| 4,988,555 A | 1/1991 | Hedblom | |
| 5,227,221 A | 7/1993 | Hedblom | |
| 5,286,682 A | 2/1994 | Jacobs | |
| 5,716,706 A | 2/1998 | Morris | |
| 5,774,265 A | 6/1998 | Mathers | |
| 5,777,791 A | 7/1998 | Hedblom | |
| 5,917,652 A | 6/1999 | Mathers | |
| 6,365,262 B1 | 4/2002 | Hedblom | |
| 7,513,941 B2 | 4/2009 | Frey | |
| 7,524,779 B2 | 4/2009 | Frey | |
| 7,579,293 B2 * | 8/2009 | Frey et al. | .............. 501/34 |
| 2002/0013207 A1 | 1/2002 | Frey | |
| 2005/0143248 A1 | 6/2005 | Frey | |
| 2005/0158461 A1 | 7/2005 | Bescup | |
| 2007/0110960 A1 | 5/2007 | Frey | |
| 2008/0041103 A1 | 2/2008 | Kramlich | |

OTHER PUBLICATIONS

Yamaguchi, "Refractive Index Measurement of High Refractive Index Glass Beads", Applied Optics, 1975, vol. 14, No. 5, pp. 1111-1115.

* cited by examiner

*Primary Examiner* — Euncha Cherry
(74) *Attorney, Agent, or Firm* — Sandra K. Nowak (57) ABSTRACT

Presently described are retroreflective articles, such as pavement markings, that comprise transparent microspheres partially embedded in a binder (e.g., polymeric). Also described are microspheres (e.g., glass-ceramic), methods of making microspheres, spheres, as well as compositions of glass materials and compositions of glass-ceramic materials. The microspheres generally comprise lanthanide series oxide(s), titanium oxide ($TiO_2$), and optionally zirconium oxide ($ZrO_2$).

18 Claims, 1 Drawing Sheet

PAVEMENT MARKINGS, REFLECTIVE ELEMENTS, AND METHODS OF MAKING MICROSPHERES

CROSS REFERENCE TO RELATED APPLICATIONS

This application is a national stage filing under 35 U.S.C. 371 of PCT/US2009/054629, filed Aug. 21, 2009, the disclosure of which is incorporated by reference in its/their entirety herein.

TECHNICAL FIELD

The present disclosure generally relates to retroreflective articles, including retroreflective pavement markings, retroreflective elements including microspheres, methods of making microspheres, microspheres, and compositions of glass and glass-ceramic materials.

BACKGROUND

Transparent glass and glass-ceramic microspheres (i.e., beads) are used as optical elements for retroreflective signage, apparel, and pavement markings. Such microspheres can be produced, for example, by melting methods. Such melting methods may include melting a raw material mixture in the form of particulate material. The melted particles can be quenched, in air or water for example, to give solid beads. Optionally, quenched particles can be crushed to form particles of a smaller desired size for the final beads. The crushed particles can be passed through a flame having a temperature sufficient to melt and spheroidize them. For many raw material compositions this is a temperature of about 1500° C. to about 3000° C. Alternatively, the melted raw material composition can be poured continuously into a jet of high velocity air. Molten droplets are formed as the jet impinges on the liquid stream. The velocity of the air and the viscosity of the melt are adjusted to control the size of the droplets. The molten droplets are rapidly quenched, in air or water, for example, to give solid beads. Beads formed by such melting methods are normally composed of a vitreous material that is essentially completely amorphous (i.e., noncrystalline), and hence, the beads are often referred to as "vitreous," "amorphous," or simply "glass" beads or microspheres.

Pavement markings including microspheres prepared from compositions that comprise lanthanum oxide and titanium oxide are described, for example, in U.S. Pat. No. 3,946,130 (Tung) and U.S. Pat. No. 5,716,706 (Morris).

SUMMARY

In one embodiment, a method of marking a pavement surface is described comprising providing a pavement surface and applying a pavement marking on the pavement surface. In another embodiment, the pavement marking includes microspheres including at least about 45 wt-% $TiO_2$; between about 0.5 wt-% and about 10 wt-% of one or more metal oxides selected from oxides of the lanthanide series elements; and at least about 0.5 wt-% of CaO. Some embodiments of these microspheres include calcium oxide as the only alkaline earth oxide present, except for trace amounts of other alkaline earth oxides (e.g., less than 0.25 wt-%) that would result from other alkaline earth oxides being impurities in any of the raw materials (i.e., such microspheres are preferably substantially free of barium oxide, strontium oxide, and magnesium oxide). In at least some embodiments that include microspheres, the microspheres may have an index of refraction of at least 2.20, at least 2.30, or at least 2.40. The microspheres are preferably transparent and preferably have a refractive index of at least 2.3.

In one preferred implementation of this embodiment, the microspheres include between about 0.5 wt-% and about 25 wt-% CaO. In another preferred implementation of this embodiment, the microspheres include at least about 1.0 wt-% CaO. In another preferred implementation of this embodiment, the microspheres include between about 45 wt-% $TiO_2$ and about 80 wt-% $TiO_2$. In another preferred implementation of this embodiment, the microspheres include at least about 1.0 wt-% of one or more metal oxides selected from oxides of the lanthanide series elements. In another preferred implementation of this embodiment, the microspheres include at least 45 wt-% $TiO_2$; at least about 0.5 wt-% and less than about 10 wt-% of one or more metal oxides selected from oxides of the lanthanide series elements; and at least about 0.5 wt-% of CaO. In all of these embodiments and implementations, the microspheres can be, for example, transparent, glass, or glass-ceramic.

In another exemplary embodiment, a retroreflective article includes a binder; and transparent microspheres comprising a glass-ceramic structure. The microspheres are fused and comprise at least about 45 wt-% titania, at least about 0.5 wt-% CaO, and between about 0.5 wt-% and about 10 wt-% of one or more metal oxides selected from oxides of the lanthanide series elements, based on the total weight of the microspheres. In at least some embodiments that includes microspheres, the microspheres may have an index of refraction of at least 2.20, at least 2.30, or at least 2.40. The microspheres preferably have a refractive index of at least 2.3. The retroreflective article can be, for example, a pavement marking or a retroreflective element.

In one preferred implementation of this embodiment, the microspheres include between about 0.5 wt-% and about 25 wt-% CaO. In another preferred implementation of this embodiment, the microspheres include at least about 1.0 wt-% CaO. In another preferred implementation of this embodiment, the microspheres include between about 45 wt-% $TiO_2$ and about 80 wt-% $TiO_2$. In another preferred implementation of this embodiment, the microspheres include at least about 1.0 wt-% of one or more metal oxides selected from oxides of the lanthanide series elements. In all of these embodiments and implementations, the microspheres can be, for example, transparent, glass, or glass-ceramic.

In other embodiments, methods of producing microspheres are described. The method comprises providing materials of the starting compositions described herein, melting the starting materials with a flame at a flame temperature of less than 2700° C. to form molten droplets, cooling the molten droplets to form quenched fused microspheres, and optionally heating the quenched fused microspheres.

In other embodiments, retroreflective articles, (e.g., glass-ceramic) microspheres, as well as glass compositions and glass-ceramic compositions are described.

DETAILED DESCRIPTION OF PREFERRED EMBODIMENTS

Presently described are retroreflective articles, such as pavement markings, that include transparent microspheres at least partially embedded in a binder (e.g., polymeric binder). Also described are microspheres (e.g., glass-ceramic), methods of making microspheres, as well as compositions of glass materials and compositions of glass-ceramic materials. The microspheres can comprise multiple alkaline earth oxides, lanthanide series oxide(s) (e.g., $La_2O_3$), titanium oxide ($TiO_2$), and optionally zirconium oxide ($ZrO_2$). This base composition will be referred to herein as "CLT." Beads that include the CLT base composition will be referred to as "CLT beads" or "CLT microspheres."

The terms "beads" and "microspheres" are used interchangeably and refer to particles that are substantially spherical.

The term "solid" refers to beads that are not hollow (i.e., free of substantial cavities or voids). For use such as lens elements, the beads are preferably spherical and preferably solid (i.e., non-porous). Solid beads are typically more durable than hollow beads. Solid beads can also focus light more effectively than hollow beads, leading to higher retroreflectivity.

The microspheres described herein are preferably transparent. The term "transparent" means that the beads when viewed under an optical microscope (e.g., at 100×) have the property of transmitting rays of visible light so that bodies beneath the beads, such as bodies of the same nature as the beads, can be clearly seen through the beads when both are immersed in oil of approximately the same refractive index as the beads. Although the oil should have an index of refraction approximating that of the beads, it should not be so close that the beads seem to disappear (as they would in the case of a perfect index match). The outline, periphery, or edges of bodies beneath the beads are clearly discernible.

The recitation of all numerical ranges by endpoint is meant to include all numbers subsumed within the range (i.e., the range 1 to 10 includes, for example, 1, 1.5, 3.33, and 10).

Beads of the types described herein are particularly useful as lens elements in retroreflective articles. Transparent beads according to the present disclosure typically have an index of refraction of at least 2.10. For retroreflective applications in water or a wet environment, the beads preferably have an index of refraction of at least 2.20, preferably of at least 2.25, preferably of at least 2.30, preferably of at least 2.35, and preferably of at least about 2.40.

Although high index of refraction glass beads have been demonstrated in the past (e.g., U.S. Pat. No. 3,493,403 (Tung)) these compositions included large amounts of titania. Further, such beads were prepared with a plasma torch that provided a fusion temperature reported to be in excess of 5000° F. (2760° C.). Also, such beads were prepared from particles less than 90 micrometers in size. Finally, such transparent fused beads were formed by rapidly quenching in water. Particles less than 90 micrometers in size heat rapidly in a plasma torch, and also quench at higher rates than larger particles, due to increasing heat transfer with decrease in a particle size. Thus, compositions that can be heated and quenched into a transparent bead less than 90 micrometers in diameter, using a plasma torch and water quenching, are often not suitable for a preparation of transparent beads with larger sizes, using lower temperature fusion equipment and air-quenching. The present inventors were interested in preparing quenched fused beads with sizes ranges that included beads larger than 90 micrometers. For practical and low-cost manufacturing, it may be desirable to use compositions that take advantage of equipment that provides a fusion temperature less than 2760° C. (e.g., less than 2700° C., less than 2600° C., less than 2500° C., less than 2400° C., less than 2300° C., less than 2200° C., less than 2100° C., less than 2000° C.). Additionally, it may be particularly advantageous if a solid transparent bead can be formed using a flame produced by the combustion of natural gas with air, which is characterized by an adiabatic flame temperature of approximately 1980° C. It may also be desirable to use equipment that provides only air-quenching. Thus, the present disclosure provides compositions with exceptional melting and glass-forming properties, making them useful for forming beads with size ranging above 90 micrometers (e.g., 100 micrometers, 150 micrometers, 200 micrometers), using combustion flame fusion processes and air-quenching.

In addition to the advantages of being conveniently melted and quenched to form transparent beads having high index of refraction, beads with high lanthana content are known to provide high refractive index, good melting behavior, and favorable crystallization on heat treatment. However, lanthana can be expensive, and can contain impurities such as ceria that can impart undesired color to the beads. Smaller amounts of lanthana, in combination with one or more alkaline earths, can sometimes provide desirable combinations of melting behavior and other properties. Beads of the present disclosure, with combinations of primarily calcia and lanthana as modifiers (CLT) melt exceptionally well, and provide surprisingly high refractive index values for given (AL)T base compositions. Calcia precursors are relatively inexpensive, and CLT beads crystallize to transparent nanocrystalline beads during rapid heat treatments.

Articles of the present disclosure share the common feature of comprising the CLT beads described herein and/or a reflective element comprising such beads at least partially embedded in a core. At least a portion of the CLT beads and/or reflective elements are exposed on the viewing surface of the article (e.g., pavement marking). The microspheres and/or reflective elements are preferably embedded in the core at a depth ranging from about 30% to about 60% of their diameters.

The pavement markings of the present disclosure preferably include a binder. In some embodiments, the binder affixes the microspheres (or the elements including microspheres) to a pavement surface. Pavement surfaces are typically substantially solid and typically include a major portion of inorganic materials. Exemplary pavement surfaces include asphalt, concrete, and the like. The binder is typically, for example, a paint, a thermoplastic material, thermoset material, or other curable material. Exemplary common binder materials include polyacrylates, methacrylates, polyolefins, polyurethanes, polyepoxide resins, phenolic resins, and polyesters. For reflective pavement marking paints, the binder may include reflective pigment.

For reflective sheeting that is suitable for reflective signage, apparel, or other uses, the binder that affixes the beads is typically transparent. Transparent binders are applied to a reflective base or may be applied to a release-coated support, from which after solidification of the binder, the beaded film is stripped and may subsequently be applied to a reflective base or be given a reflective coating or plating.

The reflective elements including microspheres and/or the microspheres of the present disclosure are typically coated with one or more surface treatments that alter the pavement marking binder wetting properties and/or improve the adhesion of the reflective elements comprising microspheres or the microspheres in the binder. The reflective elements are preferably embedded in the pavement marking binder to about 20-40%, and more preferably to about 30%, of their diameters such that the reflective elements are adequately exposed. Surface treatments that control wetting include various fluorochemical derivatives such as those commercially available from Du Pont, Wilmington, Del. under the trade designation "Krytox 157 FS." Various silanes such as those commercially available from OSI Specialties, Danbury, Conn. under the trade designation "Silquest A-1100" are suitable as adhesion promoters.

Figure 1:
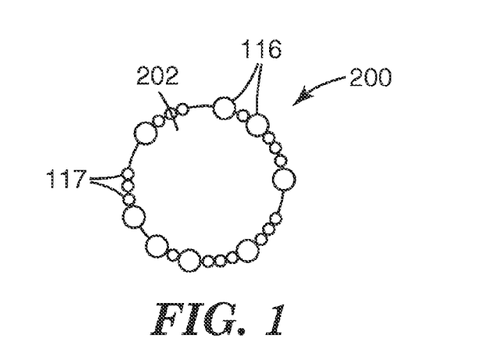
FIG. 1 is a cross-sectional view of an illustrative retroreflective element.

With reference to FIG. 1, retroreflective element 200 comprises CLT microspheres 117 alone or in combination with low index bead 116 partially embedded in the surface of a core 202. The core is typically substantially larger than the beads. For example the average core diameter may range from about 0.2 to about 10 millimeters.

The core may include an inorganic material. Glass-ceramics are also useful as a core material. The crystalline phase acts to scatter light resulting in a semi-transparent or opaque appearance. Alternatively, the core may comprise an organic material such as a thermoplastic or bonded resin core (e.g., a crosslinked cured resin such as an epoxy, polyurethanes, alkyds, acrylics, polyesters, phenolics and the like). Various epoxies, polyurethane, and polyesters are generally described in U.S. Pat. No. 3,254,563 (deVries) and U.S. Pat. No. 3,418,896 (Rideout). The core may be a composite including an inorganic particle that is coated with an organic material. In the latter case, the organic material serves as a binder to affix the beads to the outside surface of the core.

Although the retroreflective elements may be prepared from a non-diffusely reflecting bonded resin core in combination with specularly reflecting microspheres (e.g., vapor coating the microspheres with aluminum), this approach results in less durable retroreflective elements due to the use of metal which may be susceptible to chemical degradation. Less durable retroreflective elements would also result by incorporating metals (e.g., aluminum) into the core. In preferred embodiments, the retroreflective elements comprise at least one non-metallic light scattering material dispersed within core. The retroreflectance $R_A$ of the reflective elements for an entrance angle of $-4°$ and a $0.2°$ obervation angle is typically at least about 3 $(Cd/m^2)/lux$ and preferably at least about 7 $(Cd/m^2)/lux$, more preferably at least about 10 $(Cd/m^2)/lux$, and most preferably at least about 12 $(Cd/m^2)/lux$, when submerged in water.

Reflective elements may be made by known processes, such as described in U.S. Pat. No. 5,917,652 (Mathers) and U.S. Pat. No. 5,774,265 (Mathers) and in U.S. Patent Publication No. 2005/0158461 (Bescup).

Figure 2:
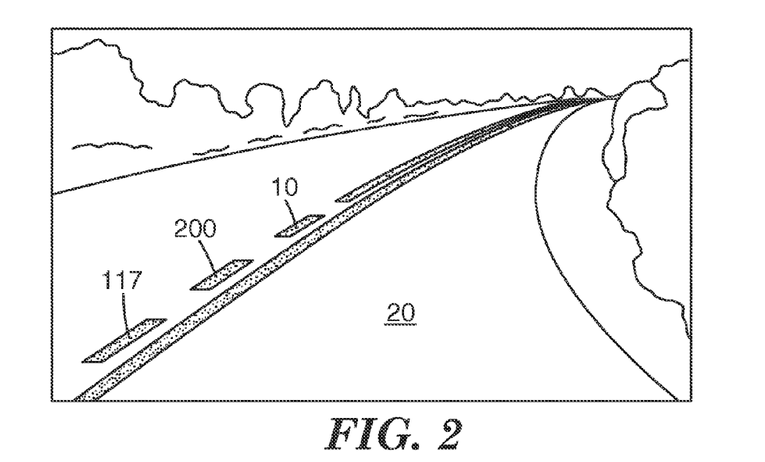
FIG. 2 is a perspective view of an illustrative pavement marking

In some embodiments, the beads and/or reflective elements are employed in liquid-applied marking (e.g., pavement) applications. With reference to FIG. 2, the beads 117 and/or reflective elements 200 are sequentially or concurrently dropped onto a liquified binder 10 or compounded within a liquified binder 10 that is provided on pavement surface 20. Although FIG. 2 shows beads 117 in one pavement marking and reflective elements 200 in a separate pavement marking, this is only one exemplary implementation. FIG. 2 and the present disclosure is also meant to cover implementations wherein beads 117 and reflective elements 200 are in the same pavement marking. Also, if beads 117 and elements 200 are included in separate pavement markings, those pavement markings need not be alternated as show specifically in FIG. 2.

In other aspects, beads and/or reflective elements are employed in retroreflective sheeting including exposed lens, encapsulated lens, embedded lens, or enclosed lens sheeting. Representative pavement-marking sheet material (tapes) are described in U.S. Pat. No. 4,248,932 (Tung et al.); U.S. Pat. No. 4,988,555 (Hedblom); U.S. Pat. No. 5,227,221 (Hedblom); U.S. Pat. No. 5,777,791 (Hedblom); and U.S. Pat. No. 6,365,262 (Hedblom).

Pavement marking sheet materials generally include a backing, a layer of binder material, and a layer of beads partially embedded in the layer of binder material. The backing, which is typically of a thickness of less than about 3 millimeters, can be made from various materials, including, for example, polymeric films, metal foils, and fiber-based sheets. Suitable polymeric materials include, for example, acrylonitrile-butadiene polymers, millable polyurethanes, and neoprene rubber. The backing can also include, for example, particulate fillers or skid resistant particles. The binder material can include various materials including, for example, vinyl polymers, polyurethanes, epoxides, and polyesters, optionally with colorants such as inorganic pigments, including, for example, specular pigments. The pavement marking sheeting can also include an adhesive, for example, a pressure sensitive adhesive, a contact adhesive, or a hot melt adhesive, on the bottom of the backing sheet.

Pavement markings typically exhibit an initial $R_L$ according to ASTM E 1710-97 of at least 300 millicandelas/$m^2$/lux, preferably at least 500 millicandelas/$m^2$/lux, more preferably at least 800 millicandelas/$m^2$/lux, and even more preferably at least 1000 millicandelas/$m^2$/lux.

Figure 3:
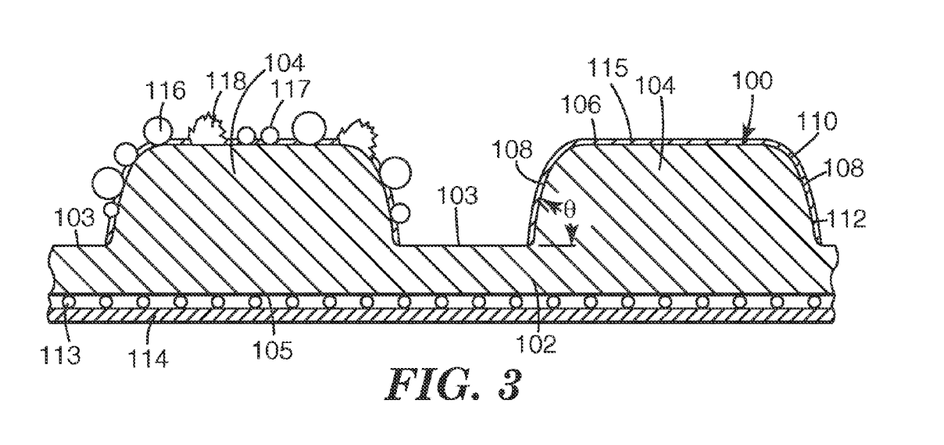
FIG. 3 is a cross-sectional view of an illustrative pavement marking tape.

Patterned retoreflective (e.g., pavement) markings advantageously include vertical or nearly vertical surfaces (for example, those defined by protrusions), in which the microspheres are partially embedded. Because light emitted by a light source typically strikes a pavement marker at a high entrance angle, vertical surfaces containing embedded microspheres provide for more effective retroreflection. For example, FIG. 3 shows patterned pavement marker 100 containing a polymeric base sheet 102 (e.g., resilient) and a plurality of protrusions 104. For illustrative purposes, only one protrusion 104 has been covered with microspheres and antiskid particles. Base sheet 102 has front surface 103 from which the protrusions extend, and back surface 105. Base sheet 102 is typically about 1 millimeter (0.04 inch) thick, but may be of other dimensions as desired. Optionally, marker 100 may further comprise scrim 113 and/or adhesive layer 114 on back surface 105. Protrusion 104 has top surface 106, side surfaces 108, and in an illustrative embodiment is about 2 millimeters (0.08 inch) high. Protrusions with other dimensions may be used as desired. As shown, side surfaces 108 meet top surface 106 at rounded top portions 110. Side surfaces 108 preferably form an angle θ of about 70° at the intersection of front surface 103 with lower portion 112 of side surfaces 108. Protrusion 104 is coated with pigment-containing binder layer 115. Embedded in binder layer 115 are a plurality of CLT microspheres 117 and a plurality of a second microspheres 116 preferably having a lower refractive index than the CLT microspheres. Optionally, antiskid particles 118 may be embedded in binder layer 115.

Pavement marking sheetings can be made by a variety of known processes. A representative example of such a process includes coating onto a backing sheet a mixture of resin, pigment, and solvent, dropping beads according to the present disclosure onto the wet surface of the backing, and curing the construction. A layer of adhesive can then be coated onto the bottom of the backing sheet. U.S. Pat. No. 4,988,541 (Hedblom) discloses a preferred method of making patterned pavement markings. Optionally, a scrim (e.g., woven or nonwoven) and/or an adhesive layer can be attached to the back side of the polymeric base sheet, if desired.

In some embodiments, two types of microspheres are employed wherein one type are the CLT beads described herein and the second type are "low index microspheres," having for example a refractive index ranging from about 1.5 to about 2.0. In some aspects, one of the two types of microspheres will be larger. For instance, the optional low index microspheres may range in diameter from 175 to 250 micrometers in diameter while the CLT microspheres are preferably about 50 to 100 micrometers in diameter. In such case, the smaller CLT microspheres may be disposed between the larger low index microspheres. As a result, the CLT microspheres are protected against abrasion caused by repeated traffic wear. Alternatively, however, the CLT microspheres can be chosen to be larger than the optional low index microspheres. Typically, the larger microspheres will cover more than about 50 percent of the retroreflective portion of the pavement marking surface area.

The optional low index microspheres are typically present in an amount of at least 25 weight percent, and preferably from about 35 to about 85 weight percent of the total amount of microspheres used. The CLT microspheres are typically present from 15 to about 75 weight percent. These ranges are preferred because they provide a good balance between dry and wet retroreflectivity and provide good abrasion resistance.

The microspheres are preferably placed selectively on the side and top surfaces of the protrusions while leaving the valleys between protrusions substantially clear so as to minimize the amount of microspheres used, thereby minimizing the manufacturing cost. The microspheres may be placed on any of the side surfaces as well as the top surface of the protrusions to achieve efficient retroreflection.

The binder layer of FIGS. 2 and 3 as well as the core of the retroreflective element depicted in FIG. 1 include a light transmissive material so that light entering the retroreflective article is not absorbed but is instead retroreflected by way of scattering or reflection off of pigment particles in the light-transmissive material. Vinyls, acrylics, epoxies, and urethanes are examples of suitable mediums. Urethanes, such as are disclosed in U.S. Pat. No. 4,988,555 (Hedblom), are preferred binder mediums at least for pavement markings. The binder layer preferably covers selected portions of the protrusions so that the base sheet remains substantially free of the binder. For ease of coating, the medium will preferably be a liquid with a viscosity of less than 10,000 centipoise at coating temperatures.

The binder layer of FIGS. 2 and 3 as well as the core of FIG. 1 typically include at least one pigment such as a diffusely reflecting or specularly reflecting pigment.

Specular pigment particles are generally thin and plate-like and are part of the binder layer, the organic core (a core comprising essentially only an organic binder material) of an element, or an organic binder coating on an inorganic particle that together make up a composite core of an element. Light striking the pigment particles is reflected at an angle equal but opposite to the angle at which it was incident. Suitable examples of specular pigments for use in the articles of the present dislosure include, for example, pearlescent pigments, mica, and nacreous pigments. Typically, the amount of specular pigment present in the binder layer is less than 50 percent by weight. Preferably, the specular pigments comprise about 15 percent to 40 percent of the binder layer by weight, this range being the optimum amount of specular pigment needed for efficient retroreflection. Pearlescent pigment particles are often preferred because of the trueness in color.

In lieu of or in addition to combining transparent beads with a reflective (e.g., pigment containing) binder and/or element core, the beads may comprise a reflective (e.g., metallic) coating. Preferably, the metallic coating is absent from the portion of the outside surface of the bead that oriented to receive the light that is to be retroreflected, and present on the portion of the outside surface of the bead that is oriented opposite to the direction from which light that is to be retroreflected is incident. For example, in FIG. 1, a metallic coating may be advantageously placed at the interface between bead 117 and core 202. In FIG. 3, a reflective layer may be advantageously placed at the interface between the bead 117 and the binder 115, such as shown in U.S. Pat. No. 6,365,262 (Hedblom). Metallic coatings may be placed on beads by physical vapor deposition means, such as evaporation or sputtering. Full coverage metallic coatings that are placed on beads can be partially removed by chemical etching.

The components of the beads are described as oxides, (the form in which the components are presumed to exist in the completely processed glass and glass-ceramic beads as well as retroreflective articles and the form that correctly accounts for the chemical elements and the proportions thereof in the beads). The starting materials used to make the beads may include some chemical compound other than an oxide, such as, for example, a carbonate. Other starting materials become modified to the oxide form during melting of the ingredients. For this reason, the compositions of the beads are discussed in terms of a theoretical oxide basis. The compositions described herein are reported on a theoretical oxide basis based on the amounts of starting materials used. These values do not necessarily account for fugitive materials (e.g., fugitive intermediates) that are volatilized during the melting and spheroidizing process.

The compositions of beads, discussed in terms of a theoretical oxide basis, can be described by listing the components together with their weight percent (wt-%) concentrations or their mole percent (mol-%) concentrations in the bead. Listing mol-% concentrations of components demands care to be explicit about the chemical formulae to which the mol-% figures are being applied. For example, in certain circumstances, it is convenient to describe lanthanum oxide by the chemical formula $La_2O_3$; however, in other circumstances it is more convenient to describe lanthanum oxide by the chemical formula $LaO_{3/2}$, The latter notation is an example of an approach where the chemical formula for a metal oxide comprising a single metal is adjusted to yield a single metal atom per formula unit and whatever quantity of oxygen atoms (even if fractional) is required to reflect accurately the overall stoichiometry of the metal oxide. For compositions expressed herein in terms of concentrations given in units of mol-% of metal oxides, the mol-% figures relate to such formula units that include a single, unitary metal atom. Microspheres preferably include at least 45 wt-% titania (e.g., 46 wt-%, 47 wt-%, 48 wt-%, 49 wt-%), and more preferably at least 50 wt-% titania (e.g., 51 wt-%, 52 wt-%, 53 wt-%, 54 wt-%, 55 wt-%, 56 wt-%, 57 wt-%, 58 wt-%, 59 wt-%). The amount of titania for the microspheres is typically less than 80 wt-% (e.g., 79 wt-%, 78 wt-%, 77 wt-%, 76 wt-%, 75 wt-%, 74 wt-%, 73 wt-%, 72 wt-%, 71 wt-%) and preferably no greater than 70 wt-% (e.g., 69 wt-%, 68 wt-%, 67 wt-%, 66 wt-%). The amount of titania in at least some embodiments ranges from 60 wt-% to 65 wt-% (e.g., 61 wt-%, 62 wt-%, 63 wt-%, 64 wt-%). Titania is a high index of refraction metal oxide with a melting point of 1840° C. and is typically used because of its optical and electrical properties, but not generally for hardness or strength. Similar to zirconia, titania is a strong nucleating agent known to cause crystallization of glass materials. Despite its high individual melting point, as a component in a mixture of certain oxides, titania can lower the liquidus temperature, while significantly raising the index of refraction of microspheres comprising such mixtures of oxides. Compositions comprising titania and optionally zirconia provide relatively low liquidus temperatures, very high index of refraction values, high crystallinity when heat-treated appropriately, useful mechanical properties, and high transparency.

In one preferred implementation of this embodiment, the microspheres include between about 0.5 wt-% and about 25 wt-% CaO. In another preferred implementation of this embodiment, the microspheres include at least about 1.0 wt-% CaO. Some implementations of these microspheres include CaO as the only alkaline earth oxide present, except for trace amounts of other alkaline earth oxides (e.g., less than 0.25 wt-%) that would result from other alkaline earth oxides being impurities in any of the raw materials (i.e., such microspheres are preferably substantially free of barium oxide, strontium oxide, and magnesium oxide). In another preferred implementation of this embodiment, the microspheres include between about 45 wt-% $TiO_2$ and about 80 wt-% $TiO_2$. In another preferred implementation of this embodiment, the microspheres include at least about 1.0 wt-% of one or more metal oxides selected from oxides of the lanthanide series elements. In another preferred implementation of this embodiment, the microspheres include at least 45 wt-% $TiO_2$; at least about 0.5 wt-% and less than about 10 wt-% of one or more metal oxides selected from oxides of the lanthanide series elements; and at least about 0.5 wt-% of CaO. In all of these embodiments and implementations, the microspheres can be, for example, transparent, glass, or glass-ceramic.

In another exemplary embodiment, a retroreflective article includes a binder; and microspheres comprising a glass-ceramic structure. The microspheres are fused and comprise at least about 45 wt-% titania, at least about 0.5 wt-% CaO, and between about 0.5 wt-% and about 10 wt-% of one or more metal oxides selected from oxides of the lanthanide series elements, based on the total weight of the microspheres. Some embodiments of these microspheres include calcium oxide as the only alkaline earth oxide present, except for trace amounts of other alkaline earth oxides (e.g., less than 0.25 wt-%) that would result from other alkaline earth oxides being impurities in any of the raw materials (i.e., such microspheres are preferably substantially free of barium oxide, strontium oxide, and magnesium oxide). In at least some embodiments that includes microspheres, the microspheres may have an index of refraction of at least 2.20, at least 2.30, or at least 2.40. The microspheres preferably have a refractive index of at least 2.3. The retroreflective article can be, for example, a pavement marking or a retroreflective element.

In one preferred implementation of this embodiment, the microspheres include between about 0.5 wt-% and about 25 wt-% CaO. In another preferred implementation of this embodiment, the microspheres include at least about 1.0 wt-% CaO. Some embodiments of these microspheres include calcium oxide as the only alkaline earth oxide present, except for trace amounts of other alkaline earth oxides (e.g., less than 0.25 wt-%) that would result from other alkaline earth oxides being impurities in any of the raw materials (i.e., such microspheres are preferably substantially free of barium oxide, strontium oxide, and magnesium oxide). In another preferred implementation of this embodiment, the microspheres include between about 45 wt-% $TiO_2$ and about 80 wt-% $TiO_2$. In another preferred implementation of this embodiment, the microspheres include at least about 1.0 wt-% of one or more metal oxides selected from oxides of the lanthanide series elements. In all of these embodiments and implementations, the microspheres can be, for example, transparent, glass, or glass-ceramic.

In other embodiments, methods of producing microspheres are described. The method comprises providing materials of the starting compositions described herein, melting the starting materials with a flame at a flame temperature of less than 2700° C. to form molten droplets, cooling the molten droplets to form quenched fused microspheres, and optionally heating the quenched fused microspheres.

In other embodiments, retroreflective articles, (e.g., glass-ceramic) microspheres, as well as glass compositions and glass-ceramic compositions are described.

In some embodiments, microspheres described herein comprise less than 10 wt-% (e.g., 0.5 wt-%, 1 wt-%, 2 wt-%, 3 wt-%, 4 wt-%, 5 wt-%, 6 wt-%, 7 wt-%, 8 wt-%, 9 wt-%) lanthanum oxide. Some embodiments include between about 0.5 wt-% and about 10 wt-% of one or more metal oxides selected from oxides of the lanthanide series elements. The amount of lanthanum oxide of some preferred embodiments ranges from 2 wt-% to 9 wt-%. The amount of lanthanum oxide in some more preferred embodiments ranges from about 4 wt-% to about 8 wt-%. The amount of lanthanum oxide in other preferred embodiments ranges from greater than about 5 wt-% to less than about 10 wt-%.

Lanthanum is one of a group of 15 chemically related elements in group IIIB of the periodic table (lanthanide series). The names and atomic numbers of the lanthanide series is as follows:

| Element | Symbol | Atomic No. |
| --- | --- | --- |
| Lanthanum | La | 57 |
| Cerium | Ce | 58 |
| Praseodymium | Pr | 59 |
| Neodymium | Nd | 60 |
| Promethium | Pm | 61 |
| Samarium | Sm | 62 |
| Europium | Eu | 63 |
| Gadolinium | Gd | 64 |
| Terbium | Tb | 65 |
| Dysprosium | Dy | 66 |
| Holmium | Ho | 67 |
| Erbium | Er | 68 |
| Thulium | Tm | 69 |
| Ytterbium | Yb | 70 |
| Lutetium | Lu | 71 |

Although promethium is a rare earth element, such element is believed not to be naturally occurring on earth. Due to the expense of manufacturing, promethium oxide is less preferred. Similarly, lanthanum and gadolinium tend to be preferred due to their greater availability. Lanthanum oxide, gadolinium oxide, and combinations thereof, may represent greater than 75 wt-% of the lanthanide series oxides of a material described herein. In some embodiments, lanthanum oxide, gadolinium oxide, and combinations thereof, represent at least 80 wt-%, at least 85 wt-%, at least 90 wt-%, at least 95 wt-%, and even 100% of the lanthanide series oxides.

In some embodiments, the microspheres may comprise oxides of other lanthanide series elements in place of or in combination with lanthanum oxide. Accordingly, the microspheres may comprise one or more oxides selected from oxides of the lanthanide series of elements. Any of the previous ranges provided with respect to lanthanum oxide content can be adjusted based on the molecular weight of the chosen combination of lanthanide series oxides to provide the same molar ratios. One preferred composition includes about 1 mol-% to about 6 mol-% of one or more oxides selected from the oxides of the lanthanide series of elements; about 3 mol-% to about 15 mol-% zirconia; about 2 mol-% to about 20 mol-% of CaO; and less than about 73 mol-% titania. Another preferred composition includes about 2 mol-% to about 5 mol-% of one or more oxides selected from the oxides of the lanthanide series of elements; about 4 mol-% to about 12 mol-% zirconia; about 3 mol-% to about 15 mol-% of CaO; and less than about 70 mol-% titania.

The microspheres described herein optionally, yet typically, comprise at least 0.5 wt-% zirconia. The amount of zirconia ranges up to 40 wt-%. The amount of zirconia is typically less than 30 wt-%. In one embodiment, the amount of zirconia ranges from about 0.5 wt-% to about 30 wt-%. In another embodiment, the amount of zirconia ranges from about 2 wt-% to about 25 wt-%. In another embodiment, the amount of zirconia ranges from about 5 wt-% to about 15 wt-%. The amount of zirconia is preferably greater than 15 wt-%. Generally, the zirconia contributes chemical and mechanical durability as well as contributes to the high index of refraction of the preferred beads. As is commonly known, zirconia often includes some level of hafnia ($HfO_2$) contamination. Also, it is known that hafnia as well as thoria ($ThO_2$) can exhibit similar physical and chemical properties to those of zirconia. Accordingly, although beads of the present disclosure are described in terms of their content of zirconia, it will be appreciated by one of ordinary skill in the art that hafnia and thoria can be substituted in part or in whole for zirconia.

CLT bead systems with greater than about 10 wt-% lanthana are reported to provide high refractive index and high bead quality. However, lanthana can be expensive, and can have impurities such as ceria that impart undesirable color to the beads. Beads with lower lanthana content in combination with calcia plus an additional alkaline earth are also reported.

Microspheres described herein may comprise up to 30 wt-% (e.g., 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%) of other metal oxides. Such other metal oxides are selected as to not detract from the higher refractive index properties of the microspheres. Other metal oxides may be selected for addition with the purpose of lowering the melting point of the material, leading to easier processing. Suitable other metal oxides include for example $LiO_2$, $Na_2O$, $K_2O$, $Al_2O_3$, $ZnO$, $SiO_2$, and $B_2O_3$. Other metal oxides may be selected for addition with the purpose of improving the mechanical properties of the material. Typically, however, the amount of such other metal oxides is typically less than 30 wt-%, less than 20 wt-%, or less than 15 wt-%, and less than 10 wt-%. In some preferred embodiments, the composition is substantially free (less than 1 wt-%) of any other metal oxides.

The glass-ceramic microspheres described herein may include one or more crystalline phases, typically totaling at least 5 volume %. Crystallinity is typically developed through heat-treatment of amorphous beads, although some glass-ceramic beads formed by quenching molten droplets may contain crystals without secondary heat treatment. Such a crystalline phase or phases may include relatively pure single-component metal oxide phases of titania (e.g., anatase, rutile) and/or zirconia (e.g., baddeleyite). Also, such a crystalline phase or phases may include relatively pure multicomponent metal oxide phases (e.g., $ZrTiO_4$). Such a crystalline phase or phases may include crystalline solid solutions that are isostructural with relatively pure single-component or multicomponent metal oxide phases. Finally, such crystalline phase or phases may include at least one heretofore unreported crystalline phase, in terms of crystal structure and/or composition. The compositions exhibit controlled crystallization characteristics such that they remain transparent following heat treatments.

Colorants can also be included in the beads. Such colorants include, for example, $CeO_2$, $Fe_2O_3$, $CoO$, $Cr_2O_3$, $NiO$, $CuO$, $MnO_2$, $V_2O_5$ and the like. Typically, the beads include no more than about 5% by weight (e.g., 1%, 2%, 3%, 4%) colorant, based on the total weight of the beads (theoretical oxide basis). Also, rare earth elements, such as praseodymium, neodymium, europium, erbium, thulium, ytterbium may optionally be included for color or fluorescence. Preferably, the microspheres are substantially free of lead oxide (PbO) and cadmium oxide (CdO).

The microspheres described herein can be prepared from a melt process. Microspheres prepared from a melt process are described herein as "fused." For ease in manufacturing, it is preferred that the microsphere composition exhibits a relatively low liquidus temperature, such as less than about 1700° C., and preferably less than about 1600° C. Typically the liquidus temperature is less than about 1500° C. Generally, formulations including those at or near a eutectic composition(s) (e.g., binary or ternary eutectic compositions) will have lowest melting points in the system and, therefore, will be particularly useful.

Upon initial formation from a melt, beads are formed that are substantially amorphous yet can contain some crystallinity. The compositions preferably form clear, transparent glass microspheres when quenched. Upon further heat treatment, the beads can develop crystallinity in the form of a glass-ceramic structure, i.e., microstructure in which crystals have grown from within an initially amorphous structure, and thus become glass-ceramic beads. Upon heat treatment of quenched beads, the beads can develop crystallinity in the form of a nanoscale glass-ceramic structure, i.e., microstructure in which crystals less than about 100 nanometers in dimension have grown from within an initially amorphous structure, and thus become glass-ceramic beads. A nanoscale glass-ceramic microstructure is a microcrystalline glass-ceramic structure comprising nanoscale crystals. It is also within the scope of the present disclosure to provide a transparent microbead that is mostly crystalline (i.e., greater than 50 vol-% crystalline) directly after quenching, thus bypassing a heat-treatment step. It is believed that in such cases, employed cooling rates are not high enough to preserve an amorphous structure, but are high enough to form nanocrystalline microstructure.

For the purposes of the present disclosure, microspheres exhibiting x-ray diffraction consistent with the presence of a crystalline phase are considered glass-ceramic microspheres. An approximate guideline in the field is that materials comprising less than about 1 volume % crystals may not exhibit detectable crystallinity in typical powder X-ray diffraction measurements. Such materials are often considered "X-ray amorphous" or glass materials, rather than ceramic or glass-ceramic materials. Microspheres comprising crystals that are detectable by X-ray diffraction measurements, typically necessary to be present in an amount greater than or equal to 1 volume % for detectability, are considered glass-ceramic microspheres for the purposes of the present disclosure. X-ray diffraction data can be collected using a Philips Automated Vertical Diffractometer with Type 150 100 00 Wide Range Goniometer, sealed copper target x-ray source, proportional detector, variable receiving slits, 0.2° entrance slit, and graphite diffracted beam monochromator (Philips Electronics Instruments Company, Mahwah, N.J.), with measurement settings of 45 kV source voltage, 35 mA source current, 0.04° step size, and 4 second dwell time. Likewise as used herein "glass microspheres" refers to microspheres having less than 1 volume % of crystals. Preferably, the glass-ceramic microspheres comprise greater than 10 volume % crystals. More preferably, the glass-ceramic microspheres comprise greater than 25 volume % crystals. Most preferably, the glass-ceramic microspheres comprise greater than 50 volume % crystals.

In preferred embodiments, the microspheres form a microcrystalline glass-ceramic structure via heat treatment yet remain transparent. For good transparency, it is preferable that the microspheres comprise little or no volume fraction of crystals greater than about 100 nanometers in dimension. Preferably, the microspheres comprise less than 20 volume % of crystals greater than about 100 nanometers in dimension, more preferably less than 10 volume %, and most preferably less than about 5 volume %. Preferably, the size of the crystals in the crystalline phase is less than about 20 nanometers (0.02 micrometers) in their largest linear dimension. Crystals of this size typically do not scatter visible light effectively, and therefore do not decrease the transparency significantly.

Beads can be made and used in various sizes. It is uncommon to deliberately form beads smaller than 10 micrometers in diameter, though a fraction of beads down to 2 micrometers or 3 micrometers in diameter is sometimes formed as a by-product of manufacturing larger beads. Accordingly, the beads are preferably at least 20 micrometers, (e.g., at least 50 micrometers, at least 100 micrometers, at least 150 micrometers.) Generally, the uses for high index of refraction beads call for them to be less than about 2 millimeters in diameter, and most often less than about 1 millimeter in diameter (e.g., less than 750 micrometers, less than 500 micrometers, less than 300 micrometers).

Glass microspheres can be prepared by fusion processes as disclosed, for example, in U.S. Pat. No. 3,493,403 (Tung et al). In one useful process, the starting materials are measured out in particulate form, each starting material being preferably about 0.01 micrometer to about 50 micrometer in size, and intimately mixed together. The starting raw materials include compounds that form oxides upon melting or heat treatment. These can include oxides, (e.g., titania, zirconia, and alkaline earth metal oxide(s)), hydroxides, acid chlorides, chlorides, nitrates, carboxylates, sulfates, alkoxides, and the like, and the various combinations thereof. Moreover, multicomponent metal oxides such as lanthanum titanate ($La_2TiO_5$) and barium titanate ($BaTiO_3$) can also be used. Glass microspheres can, alternatively, be prepared by other conventional processes as, for example, disclosed in U.S. Pat. No. 2,924,533 (McMullen et al) and in U.S. Pat. No. 3,499,745 (Plumat). The oxide mixture can be melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have a sufficiently low viscosity and high surface tension. Typical sizes of beads prepared by this method range from several tenths of a millimeter to 3-4 millimeters.

Melting of the starting materials is typically achieved by heating at a temperature within a range of about 1500° C. to about 1900° C., and often at a temperature, for example, of about 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the melted starting material is quenched in water, dried, and crushed to form particles of a size desired for the final beads. The crushed particles can be screened to ensure that they are in the proper range of sizes. The crushed particles can then be passed through a flame having a temperature sufficient to remelt and spheroidize the particles.

In one exemplary preferred method, the starting materials are first formed into larger feed particles. The feed particles are fed directly into a burner, such as a hydrogen-oxygen burner or an acetylene-oxygen burner or a methane-air burner, and then quenched in water (e.g., in the form of a water curtain or water bath). Feed particles may be formed by melting and grinding, agglomerating, or sintering the starting materials. Agglomerated particles of up to about 2000 micrometers in size (the length of the largest dimension) can be used, although particles of up to about 500 micrometers in size are preferred. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal orientation. Typically, the feed particles are fed into the flame at its base. This horizontal orientation is desired because it can produce very high yields (e.g., 100%) of spherical particles of the desired level of transparency. The procedure for cooling the molten droplets can involve air cooling or rapid cooling. Rapid cooling is achieved by, for example, dropping the molten droplets of starting material into a cooling medium such as water or cooling oil. In addition, a method can be used in which the molten droplets are sprayed into a gas such as air or argon. The resultant quenched fused beads are typically sufficiently transparent for use as lens elements in retroreflective articles. For certain embodiments, they are also sufficiently hard, strong, and tough for direct use in retroreflective articles. A subsequent heat-treating step can improve their mechanical properties. Also, heat treatment and crystallization lead to increases in index of refraction.

In a preferred embodiment, a bead precursor can be formed and subsequently heated. As used herein, a "bead precursor" refers to the material formed into the shape of a bead by melting and cooling a bead starting composition. This bead precursor is also referred to herein as a quenched fused bead, and may be suitable for use without further processing if the mechanical properties, index of refraction, and transparency are of desirable levels. The bead precursor is formed by melting a starting composition containing prescribed amounts of raw materials (e.g., titanium raw material, optional raw materials), forming molten droplets of a predetermined particle size, and cooling those molten droplets. The starting composition is prepared so that the resulting bead precursor contains the desired metal oxides in predetermined proportions. The particle size of the molten droplets is normally within the range of about 10 micrometers to about 2,000 micrometers. The particle size of the bead precursors as well as the particle size of the final transparent fused beads can be controlled with the particle size of the molten droplets.

In certain preferred embodiments, a bead precursor (i.e., quenched fused bead) is subsequently heated. Preferably, this heating step is carried out at a temperature below the melting point of the bead precursor. Typically, this temperature is at least about 750° C. Preferably, it is about 850° C. to about 1000° C., provided it does not exceed the melting point of the bead precursor. If the heating temperature of the bead precursor is too low, the effect of increasing the index of refraction or the mechanical properties of the resulting beads will be insufficient. Conversely, if the heating temperature is too high, bead transparency can be diminished due to light scattering from large crystals. Although there are no particular limitations on the time of this heating step to increase index of refraction, develop crystallinity, and/or improve mechanical properties, heating for at least about 1 minute is normally sufficient, and heating should preferably be performed for about 5 minutes to about 100 minutes. In addition, preheating (e.g., for about 1 hour) at a temperature within the range of about 600° C. to about 800° C. before heat treatment may be advantageous because it can further increase the transparency and mechanical properties of the beads. Typically, and preferably, heat-treatment step is conducted in air or oxygen. These atmospheres are generally beneficial in improving color characteristic of beads, making them whiter. It is also within the scope of the present disclosure to conduct heat-treatment in an atmosphere other than air or oxygen.

The latter method of preheating is also suitable for growing fine crystal phases in a uniformly dispersed state within an amorphous phase. A crystal phase containing oxides of zirconium, titanium, etc., can also form in compositions containing high levels of zirconia or titania upon forming the beads from the melt (i.e., without subsequent heating). Significantly, the crystal phases are more readily formed (either directly from the melt or upon subsequent heat treatment) by including high combined concentrations of titania and zirconia (e.g., combined concentration greater than 70%).

Microspheres made from a melt process are characterized as "fused." Fully vitreous fused microspheres comprise a dense, solid, atomistically homogeneous glass network from which nanocrystals can nucleate and grow during subsequent heat treatment.

The crush strength values of the beads can be determined according to the test procedure described in U.S. Pat. No. 4,772,511 (Wood). Using this procedure, the beads demonstrate a crush strength of preferably at least about 350 MPa, more preferably at least about 700 MPa.

The durability of the beads can be demonstrated by exposing them to a compressed air driven stream of sand according to the test procedure described in U.S. Pat. No. 4,758,469 (Lange). Using this procedure, the beads are resistant to fracture, chipping, and abrasion, as evidenced by retention of about 30% to about 60% of their original retroreflected brightness.

EXAMPLES

The following provides an explanation of the present diclosure with reference to examples and comparative examples. It should be understood that the present disclosure is no way limited to these examples. All percentages are in weight percents, based on the total weight of the compositions, unless otherwise specified.

Test Methods
1. Wet patch brightness values were determined using a retroluminometer. The device directs white light onto a planar monolayer of microspheres disposed on a white backing material at a fixed entrance angle to the normal to the monolayer. Retroreflective brightness, patch brightness, is measured by a photodetector at a fixed divergence angle to the entrance angle (observation angle) in units of $(Cd/m^2)/lux$. Data reported herein were measured at −4° entrance angle and 0.2° observation angle. Retroreflective brightness measurements were made for the purpose of comparison of brightness between beads of different composition. The values were normalized by dividing by a constant factor greater than the highest measured value. All measurements were made on samples with a layer of water with thickness about 1 millimeter on top of and in contact with the beads.
2. Index of refraction of the microspheres was measured according to T. Yamaguchi, "Refractive Index Measurement of High Refractive Index Beads," Applied Optics Volume 14, Number 5, pages 1111-1115 (1975).

Examples 1-13

Starting Materials

The following starting materials were employed in the examples:

zirconium oxide—commercially available from Z-TECH division of Carpenter Engineering Products, Bow, N.H., under the trade designation "CF-PLUS-HM"

titanium oxide—commercially available from KRONOS Incorporated, Cranbury, N.J., under the trade designation "KRONOS 1000"

barium carbonate—commercially available from Chemical Products Corporation, Cartersville, Ga., under the trade designation "Type S"

strontium carbonate—commercially available from Chemical Products Corporation, Cartersville, Ga., under the trade designation "Type B"

lanthanum oxide—commercially available from Treibacher, Industrie Inc., Toronto, Ontario, Canada, under the trade designation "Lanthanum Oxide $La_2O_3$, 99.9%"

Microsphere Preparation

For each example, the gram amounts of each metal oxide as specified in Table 1 as follows were combined in a 1 quart porcelain jar mill with 3 g of sodium carboxymethylcellulose (commercially available from the Aqualon Division of Hercules Incorporated, Hopewell, Va., under the trade designation "CMC 7L2C"), approximately 350 g of water, and approximately 1600 g of 1 cm diameter zirconium oxide milling media.

The resulting slurry was milled by rotating the above assembly at approximately 100 revolutions per minute for approximately 24 hours and then dried overnight at 100° C. to yield a mixed powder cake with the components homogeneously distributed. After grinding with a mortar and pestle, the dried particles were sized by passing through a sieve. Particles (<212 microns diameter) were then fed into the flame of a hydrogen/oxygen torch (commercially available from Bethlehem Apparatus Company, Hellertown, Pa. under the trade designation "Bethlehem Bench Burner PM2D Model-B"), referred to as "Bethlehem burner" hereinafter. The Bethlehem burner delivered hydrogen and oxygen at the following rates, standard liters per minute (SLPM):

|  | Hydrogen | Oxygen |
| --- | --- | --- |
| Inner ring | 8.0 | 3.0 |
| Outer ring | 23.0 | 9.8 |
| Total | 31.0 | 12.8 |

The particles were melted by the flame and transported to a water quenching vessel, yielding fused microspheres. The quenched particles were dried and then passed through the flame of the Bethlehem burner a second time, where they were melted again and transported to the water quenching vessel. A portion of the quenched microspheres was heat-treated by heating at 10° C./minute to 850° C., holding at 850° C. for 1 hour, and furnace cooling.

Table 2 describes the theoretical bead composition for each example, accounting for decomposition of any carbonate that was present in the raw material batches. Table 2 also reports index of refraction values for quenched microspheres i) after flame-forming and ii) after furnace heat-treatment. Finally, Table 2 also reports the wet patch brightness values for heat-treated microspheres that were sieved to diameter less than 106 micrometers.

TABLE I

Batch Amounts

| Example No. | TiO$_2$ (g) | ZrO$_2$ (g) | La$_2$O$_3$ (g) | SrCO$_3$ (g) | CaCO$_3$ (g) | BaCO$_3$ (g) |
|---|---|---|---|---|---|---|
| 1 | 139.45 | 13.97 | 12.06 | 16.74 | 11.35 | 22.37 |
| 2 | 147.59 | 14.79 | 12.76 | 17.71 | 24.02 | 0.00 |
| 3 | 143.05 | 13.14 | 11.34 | 15.74 | 10.67 | 21.04 |
| 4 | 136.67 | 13.69 | 11.82 | 16.40 | 11.12 | 21.93 |
| 5 | 153.95 | 21.88 | 0.00 | 0.00 | 43.15 | 0.00 |
| 6 | 135.59 | 27.89 | 20.06 | 16.71 | 11.33 | 0.00 |
| 7 | 139.33 | 25.46 | 20.35 | 11.30 | 15.32 | 0.00 |
| 8 | 134.34 | 24.54 | 19.62 | 10.89 | 7.38 | 14.56 |
| 9 | 138.19 | 28.43 | 12.27 | 20.43 | 13.85 | 0.00 |
| 10 | 133.66 | 27.50 | 11.87 | 13.18 | 8.93 | 17.61 |
| 11 | 131.88 | 27.13 | 19.51 | 0.00 | 11.02 | 21.72 |
| 12 | 129.60 | 27.80 | 16.10 | 39.60 | 0.00 | 0.00 |
| 13 | 142.89 | 29.40 | 12.69 | 0.00 | 28.65 | 0.00 |

TABLE II

Example Compositions and Measured Properties for Beads

| Example # | TiO$_2$ (wt-%) | ZrO$_2$ (wt-%) | La$_2$O$_3$ (wt-%) | CaO (wt-%) | SrO (wt-%) | BaO (wt-%) | Index of Refraction after Flame-Forming and Heat-Treatment | Wet Patch Brightness at −4° entrance and 0.2° observation (Cd/m$^2$)/lux |
|---|---|---|---|---|---|---|---|---|
| 1 | 69.73 | 6.99 | 5.54 | 5.87 | 3.18 | 8.69 | 2.38 | 13.9 |
| 2 | 73.80 | 7.39 | 5.86 | 6.22 | 6.73 | 0.00 | 2.42 | 13.2 |
| 3 | 71.53 | 6.57 | 5.21 | 5.53 | 2.99 | 8.18 | 2.40 | 10.4 |
| 4 | 68.46 | 6.86 | 5.44 | 5.77 | 3.12 | 8.53 | 2.39 | 13.7 |
| 5 | 76.97 | 10.94 | 0.00 | 0.00 | 0.00 | 12.09 | N/A | N/A |
| 6 | 67.80 | 13.95 | 9.22 | 5.86 | 3.17 | 0.00 | 2.404 | 14.0 |
| 7 | 69.67 | 12.73 | 9.35 | 3.96 | 4.29 | 0.00 | 2.482 | 7.6 |
| 8 | 67.17 | 12.27 | 9.01 | 3.82 | 2.07 | 5.66 | 2.410 | 13.9 |
| 9 | 69.10 | 14.21 | 5.64 | 7.17 | 3.88 | 0.00 | 2.435 | 13.7 |
| 10 | 66.83 | 13.75 | 5.45 | 4.62 | 2.50 | 6.84 | 2.408 | 14.4 |
| 11 | 65.94 | 13.57 | 8.97 | 0.00 | 3.09 | 8.44 | 2.417 | 14.0 |
| 12 | 64.80 | 13.90 | 7.40 | 0.00 | 13.90 | 0.00 | 2.42 | 11.00 |
| 13 | 71.45 | 14.70 | 5.83 | 8.03 | 0 | 0 | 2.45 | 12.40 |

TABLE III

Example Compositions for Beads

| Example No. | TiO$_2$ (mol-%) | ZrO$_2$ (mol-%) | LaO$_{3/2}$ (mol-%) | SrO (mol-%) | CaO (mol-%) | BaO (mol-%) |
|---|---|---|---|---|---|---|
| 1 | 77.00 | 5.00 | 3.00 | 5.00 | 5.00 | 5.00 |
| 2 | 77.00 | 5.00 | 3.00 | 5.00 | 10.00 | 0.00 |
| 3 | 78.50 | 4.67 | 2.80 | 4.67 | 4.67 | 4.67 |
| 4 | 77.00 | 5.00 | 3.00 | 5.00 | 5.00 | 5.00 |
| 5 | 76.00 | 7.00 | 0.00 | 0.00 | 17.00 | 0.00 |
| 6 | 75.00 | 10.00 | 5.00 | 5.00 | 5.00 | 0.00 |
| 7 | 76.00 | 9.00 | 5.00 | 3.33 | 6.67 | 0.00 |
| 8 | 76.00 | 9.00 | 5.00 | 3.33 | 3.33 | 3.33 |
| 9 | 75.00 | 10.00 | 3.00 | 6.00 | 6.00 | 0.00 |
| 10 | 75.00 | 10.00 | 3.00 | 4.00 | 4.00 | 4.00 |
| 11 | 75.00 | 10.00 | 5.00 | 0.00 | 5.00 | 5.00 |
| 12 | 73.51 | 10.22 | 4.12 | 12.15 | 0.00 | 0.00 |
| 13 | 75.00 | 10.00 | 3.00 | 12.00 | 0.00 | 0.00 |

Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. Microspheres, comprising:
   at least about 45 wt-% TiO$_2$;
   between about 0.5 wt-% and about 10 wt-% of one or more metal oxides selected from oxides of the lanthanide series elements; and
   at least about 0.5 wt-% of CaO;
   wherein the microspheres have a refractive index of at least 2.3.

2. The microspheres of claim 1, wherein the microspheres are transparent.

3. The microspheres of claim 1, wherein the microspheres are glass.

4. The microspheres of claim 1, wherein the microspheres are glass-ceramic.

5. The microspheres of claim 1, comprising between about 0.5 wt-% and about 25 wt-% CaO.

6. The microspheres of claim 1, comprising at least about 1.0 wt-% CaO.

7. The microspheres of claim 1, comprising between about 45 wt-% TiO$_2$ and about 80 wt-% TiO$_2$.

8. The microspheres of claim 1, comprising at least about 1.0 wt-% of one or more metal oxides selected from oxides of the lanthanide series elements.

9. The microspheres of claim 1, comprising at least about 0.5 wt-% of CaO and one or more additional alkaline earth oxides for a total alkaline earth oxide content that is less than 30 wt-%.

10. The microspheres of claim 1, comprising:
   at least 45 wt-% TiO$_2$;
   at least about 0.5 wt-% and less than about 10 wt-% of one or more metal oxides selected from oxides of the lanthanide series elements; and
   at least about 0.5 wt-% of CaO.

11. A retroreflective article, comprising:
   a binder; and
   microspheres comprising a glass-ceramic structure where the microspheres are fused and comprise at least about 45 wt-% titania, at least about 0.5 wt-% CaO, and between about 0.5 wt-% and about 10 wt-% of one or more metal oxides selected from oxides of the lanthanide series elements, based on the total weight of the microspheres.

12. The retroreflective article of claim 11, wherein the retroreflective article is a pavement marking.

13. The retroreflective article of claim 11, wherein the retroreflective article is a retroreflective element.

14. The retroreflective article of claim 11, wherein the microspheres include between about 0.5 wt-% and about 25 wt-% CaO.

15. The retroreflective article of claim 11, wherein the microspheres include at least about 1.0 wt-% CaO.

16. The retroreflective article of claim 11, wherein the microspheres include between about 45 wt-% TiO$_2$ and about 80 wt-% TiO$_2$.

17. The retroreflective article of claim 11, wherein the microspheres include at least about 1.0 wt-% of one or more metal oxides selected from oxides of the lanthanide series elements.

18. The retroreflective article of claim 11, wherein calcium oxide as the only alkaline earth oxide present except for trace amounts of less than about 0.25 wt-% of other alkaline earth oxides.

* * * * *

UNITED STATES PATENT AND TRADEMARK OFFICE
CERTIFICATE OF CORRECTION

PATENT NO.       : 8,591,044 B2                                          Page 1 of 1
APPLICATION NO.  : 13/391379
DATED            : November 26, 2013
INVENTOR(S)      : Kenton D Budd et al.

It is certified that error appears in the above-identified patent and that said Letters Patent is hereby corrected as shown below:

In the Specification

<u>Column 1</u>
Lines 56-57, delete "micropheres" and insert -- microspheres --.

<u>Column 2</u>
Line 67, delete "marking" and insert -- marking. --.

<u>Column 3</u>
Line 15, delete "(ZrO$_2$)." and insert -- (ZrO$_2$). --.

<u>Column 5</u>
Line 44, delete "obervation" and insert -- observation --.

<u>Column 7</u>
Line 62, delete "dislosure" and insert -- disclosure --.

<u>Column 8</u>
Line 6, delete "Preferrably," and insert -- Preferably, --.

<u>Column 9</u>
Line 7, delete "refration" and insert -- refraction --.

<u>Column 14</u>
Lines 30-43, after "transparency." delete "The procedure for ....index of refraction." and insert the same on Col. 14, Line 31 as a new paragraph.

<u>Column 15</u>
Lines 52-53 (approx.), delete "diclosure" and insert -- disclosure --.

Signed and Sealed this
Third Day of June, 2014

Michelle K. Lee
*Deputy Director of the United States Patent and Trademark Office*